(12) United States Patent
Bell et al.

(10) Patent No.: US 8,518,157 B2
(45) Date of Patent: Aug. 27, 2013

(54) DEVICE AND METHOD FOR PURIFYING A PROCESS GAS IN A REFLOW SOLDERING SYSTEM

(75) Inventors: Hans Bell, Berlin (DE); Jürgen Felgner, Augsburg (DE); Ralf Heidenreich, Dresden (DE)

(73) Assignee: Rehm Thermal Systems GmbH, Blaubeuren-Seissen (DE)

( * ) Notice: Subject to any disclaimer, the term of this patent is extended or adjusted under 35 U.S.C. 154(b) by 884 days.

(21) Appl. No.: 11/885,763

(22) PCT Filed: Feb. 20, 2006

(86) PCT No.: PCT/EP2006/001516
§ 371 (c)(1),
(2), (4) Date: May 5, 2008

(87) PCT Pub. No.: WO2006/094621
PCT Pub. Date: Sep. 14, 2006

(65) Prior Publication Data
US 2008/0276801 A1 Nov. 13, 2008

(30) Foreign Application Priority Data
Mar. 7, 2005 (DE) .......................... 10 2005 010 378

(51) Int. Cl.
*B01D 47/14* (2006.01)
(52) U.S. Cl.
USPC ................ 95/210; 95/214; 95/219; 95/228; 96/242; 96/266; 96/290; 96/306; 96/361; 55/385.1
(58) Field of Classification Search
USPC ............. 95/69, 210, 211, 214, 219, 220, 226, 95/228; 96/55, 57, 242, 266, 269, 270, 278–280, 96/290, 297, 300, 355, 361; 261/94, 115, 261/117, 118, DIG. 11, DIG. 43, DIG. 44; 123/25 R; 423/243.08
See application file for complete search history.

(56) References Cited

U.S. PATENT DOCUMENTS 2,070,263 A * 2/1937 Dressel et al. ................ 423/487
2,161,055 A * 6/1939 Johnstone et al. ............ 423/539
(Continued)

FOREIGN PATENT DOCUMENTS

DE 4202812 8/1993
DE 19715704 C2 10/1997
(Continued)

OTHER PUBLICATIONS

Search Report for PCT/EP2006/001516, dated Jun. 26, 2006, 2 pages.
(Continued)

*Primary Examiner* — Duane Smith
*Assistant Examiner* — Minh-Chau Pham
(74) *Attorney, Agent, or Firm* — Sterne, Kessler, Goldstein & Fox P.L.L.C.

(57) ABSTRACT

Disclosed is a device for purifying a process gas in a reflow soldering system. Said device comprises a receptacle that contains at least one packing bed. The process gas is fed to the receptacle via a gas inlet while being discharged from the receptacle after penetrating the packing bed. The inventive device further comprises an apparatus for delivering a liquid fluid to the receptacle. Secondary materials of the soldering process in the reflow soldering system can be absorbed by the liquid fluid and thus be eliminated from the process gas. Secondary materials and/or droplets and vapors of the fluid can additionally be absorbed and adsorbed on the surface of the packing.

17 Claims, 3 Drawing Sheets

(56) References Cited

U.S. PATENT DOCUMENTS

Figure 1:
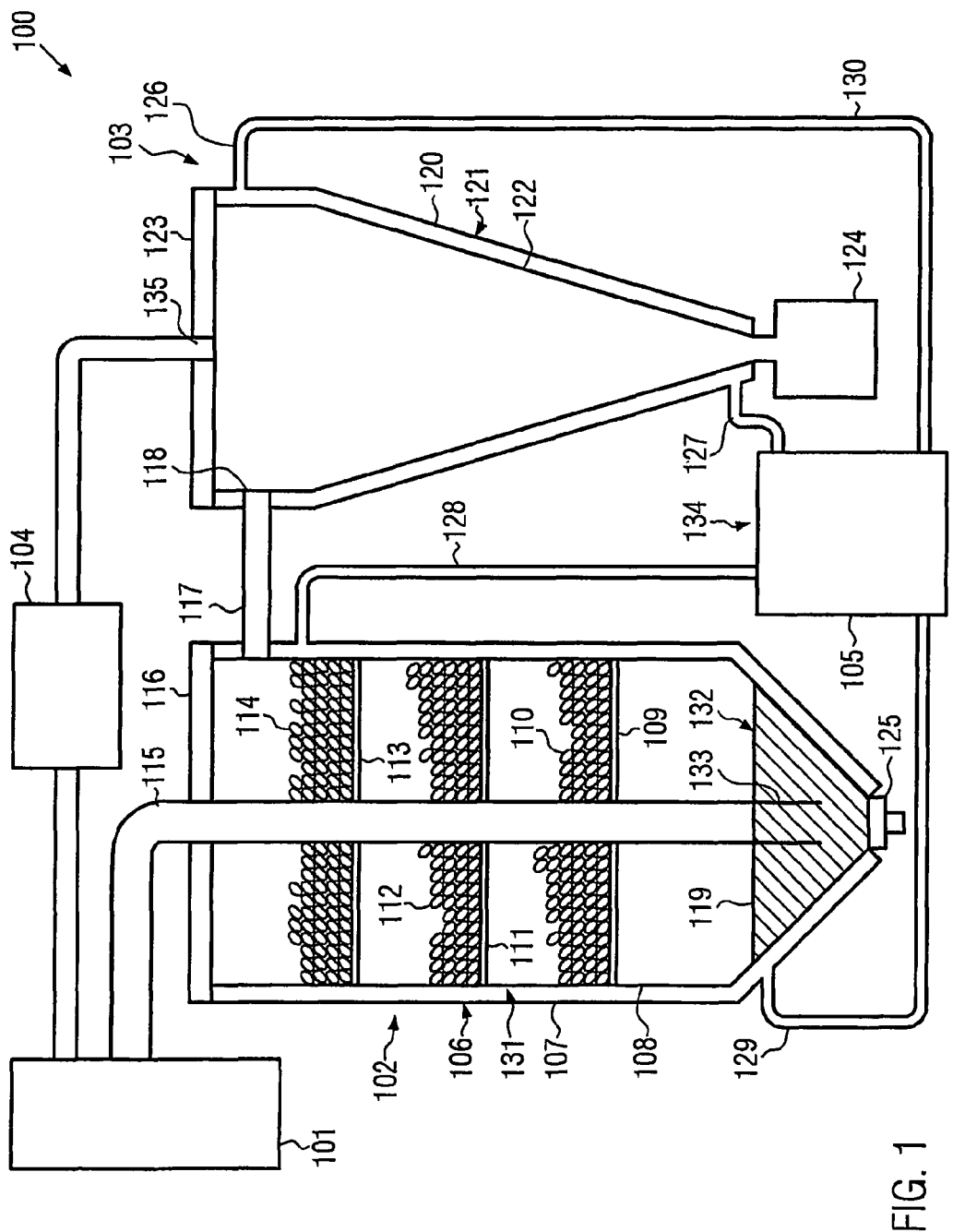

| | | | | |
|---|---|---|---|---|
| 2,703,151 | A | * | 3/1955 | Glinka .................. 55/434.4 |
| 3,768,234 | A | * | 10/1973 | Hardison .................. 96/253 |
| 3,789,109 | A | | 1/1974 | Lyon et al. |
| 3,885,929 | A | | 5/1975 | Lyon et al. |
| 4,110,088 | A | * | 8/1978 | Cold et al. .................. 95/211 |
| 4,340,572 | A | * | 7/1982 | Ben-Shmuel et al. ... 423/243.08 |
| 4,423,704 | A | * | 1/1984 | Persinger .................. 123/25 R |
| 4,460,552 | A | * | 7/1984 | Zakrzewski .................. 423/210 |
| 4,533,367 | A | | 8/1985 | Hadzismajlovic |
| 4,850,117 | A | | 7/1989 | Venkat et al. |
| 5,064,506 | A | * | 11/1991 | Sparenberg et al. .............. 203/2 |
| 5,348,715 | A | * | 9/1994 | Chang .................. 423/235 |
| 5,618,506 | A | * | 4/1997 | Suzuki et al. .................. 423/228 |
| 5,651,925 | A | * | 7/1997 | Ashley et al. .................. 264/12 |
| 5,883,292 | A | * | 3/1999 | Dassel et al. .................. 562/413 |
| 6,019,818 | A | * | 2/2000 | Knapp .................. 95/187 |
| 6,174,498 | B1 | * | 1/2001 | Jain et al. .................. 422/122 |
| 6,391,093 | B1 | | 5/2002 | French et al. |
| 6,656,250 | B1 | | 12/2003 | Listner et al. |
| 6,672,572 | B2 | * | 1/2004 | Werlen .................. 261/94 |
| 6,759,018 | B1 | | 7/2004 | Arno et al. |
| 2006/0107838 | A1 | | 5/2006 | Meier et al. |

FOREIGN PATENT DOCUMENTS

| | | | |
|---|---|---|---|
| DE | 3520671 C2 | | 12/1998 |
| DE | 19832174 | | 2/2000 |
| DE | 10246540 | | 4/2004 |
| EP | 0689873 | | 1/1996 |
| JP | 59029020 | | 2/1984 |
| JP | 11033332 A | | 2/1999 |
| WO | WO 92/08541 | * | 5/1992 |
| WO | WO 00/59608 | * | 10/2000 |

OTHER PUBLICATIONS

Patent Abstract of Japan, Japanese Pub. No. 59029020, published Feb. 16, 1984, 1 pg.

Translation of Russian Official Action, Appl. No. 2007132853/15, dated May 7, 2009, 4 pgs.

* cited by examiner

DEVICE AND METHOD FOR PURIFYING A PROCESS GAS IN A REFLOW SOLDERING SYSTEM

The present invention generally relates to reflow soldering, in particular to the purification of process gases in reflow soldering systems.

Reflow soldering is often employed for fixing electronic components on a circuit board. In reflow soldering solder is first applied to the pads of a circuit board. Then the components are assembled onto the circuit board and the solder is melted by heat. When the solder solidifies again, the components are permanently joined to the circuit board.

On heating the solder sublimation and vaporisation products (termed waste products in the following) are produced, which are initially present in the gaseous state or in the form of small liquid droplets or smoke and enter into the process gas volume of the soldering system. If the waste products are not removed from the soldering system, they can condense or resublime on parts of the system at low temperature or become deposited in the soldering system. This leads to contamination of the soldering system.

Fitting a reflow soldering system with a cooling device is the state of the art. A gas flow from the soldering system is passed into the cooling device to condense the contaminants there. Then the process gas is passed back into the soldering system from the cooling device. A device of this nature is described for example in the publication DE10301102 A1.

During the purification of the process gas of a reflow soldering system with the aid of a cooling device the problem occurs however that the temperature at which the contaminants condense or resublime depends on the materials which are used in the circuit board and components and on the composition of the solder and the soldering flux used during soldering. It is generally not predictable how far the process gas has to be cooled to essentially remove the waste products. This means that the design and operation of the cooling device is made more difficult. In addition it is necessary to regularly clean the cooling device to remove the waste products deposited in it. This may be associated with substantial maintenance effort which increases the operating costs of the soldering system.

Furthermore, it is the state of the art that the process gas is passed through a filter. The filter is designed to retain the waste products. The filter has however only a limited retention capacity. When this capacity is exhausted, the filter must be replaced or cleaned. In this case the problem arises that the filter replacement or cleaning of the filter may be associated with substantial maintenance effort. In addition, the filters are often not very effective or the service life is very short.

A possible solution is also to bring the process gas from the soldering system into contact with a purifying fluid. The purifying fluid should absorb the waste products, thus removing them from the process gas. In this respect it is known that the process gas can be passed in the form of bubbles through the purifying fluid with it passing past a separation wall along which the purifying fluid flows, or the process gas is passed through a space in which the purifying fluid is sprayed. Purification devices, which operate according to this principle, are for example described in the publication DE 10246540 A1.

One problem which occurs with the known purification devices in which a purifying fluid is used is that droplets of the purifying fluid are taken along in the flow of the process gas and can penetrate into the soldering system. Consequently, the soldering system can be contaminated. In addition it can be difficult to ensure that the waste products are actually absorbed by the purifying fluid.

The object of the present invention is accordingly to provide a device and a method for the purification of a process gas of a reflow soldering system, with which waste products can be reliably removed from the process gas and with which the costs for maintenance and servicing of the soldering system can be reduced.

According to a first aspect of the present invention this object is solved by a device for the purification of a process gas of a reflow soldering system with a receptacle which contains at least one packing bed containing packing. Furthermore, the device comprises a gas feed and a gas outlet. The gas feed is designed to feed the process gas to the receptacle. The gas outlet is designed to discharge the process gas from the receptacle after flowing through at least one bed of packing. In addition the device comprises an arrangement for feeding a liquid fluid, acting as a purifying medium for the removal of waste products from the process gas, to the receptacle.

The packing provides a surface on which the waste products of the soldering process in the reflow soldering system and/or droplets of the liquid fluid can be deposited. In this way the decomposition products and/or the droplets of the fluid from the process gas, which flows through the bed of packing, can be removed. Thus, contaminants in the soldering system can be avoided. The liquid fluid can be simply replaced, by means of which the costs of service and maintenance required for the operation of the soldering system can be reduced.

In a further advantageous embodiment of the invention the device for the purification of a process gas comprises additionally a volume which is suitable for accommodating a bath of the fluid for introducing the process gas. In this way the process gas can come into contact with the fluid.

Fittingly, the gas feed is designed to pass the process gas through the volume. In this way the process gas can flow through the fluid during the operation of the device by means of which a particularly intensive contact between the process gas and the fluid is established.

In a further advantageous embodiment of the invention the device for the purification of the process gas comprises additionally at least one column plate on which at least one bed of packing is located. In this way the bed of packing can be arranged in a manner which is particularly favourable for the through-flow of the process gas.

Advantageously, the device for the purification of a process gas of a reflow soldering system comprises several column plates arranged one above the other on each of which a bed of packing is located. Thus, the process gas can flow consecutively through the column plates and the beds of packing by means of which thorough purification of the process gas can be achieved.

According to a further embodiment of the invention the arrangement for feeding the fluid is designed such that the at least one bed of packing is moistened with the fluid. Through the moistening of the packing a large boundary area is provided between the fluid and the process gas. In this way the contact between the process gas and the fluid is improved.

Fittingly, the arrangement for feeding the fluid comprises at least one spray nozzle and/or at least one drop dispenser. In this way a uniform moistening of the bed of packing can be achieved.

Advantageously the device for the purification of a process gas of a reflow soldering system comprises additionally a catchment receptacle for the fluid. This enables fluid, which has seeped through the bed of packing, to be simply removed from the device.

In a further advantageous embodiment of the invention the at least one bed of packing takes up at least half the volume of the receptacle. Due to the large amount of packing intensive purification of the process gas can be achieved.

Fittingly, the device for the purification of a process gas of a reflow soldering system comprises additionally a cooling device. Thus a device temperature favourable for the purification of the process gas can be set.

Advantageously, the cooling device comprises a suitable receptacle casing for the through-flow of coolant. In this way uniform cooling of the receptacle can be achieved.

In a further advantageous embodiment of the invention the cooling device comprises a suitable cooler inside the receptacle which is suitable for the through-flow of a coolant. Thus efficient cooling of the inner regions of the receptacle can be achieved.

Advantageously, the device for the purification of a process gas comprises additionally a separation device. This enables droplets and/or vapours of the fluid and residues of the waste products, which have not been absorbed by the liquid fluid, to be removed from the process gas.

Fittingly, the separation device comprises a cyclone type of receptacle, which for example is formed in a hopper shape, with a casing suitable for the through-flow of a coolant. A gas inlet is designed to introduce the process gas tangentially to a circumference of the cyclone type receptacle at an upper end of the cyclone type receptacle. An essentially vertical gas outlet is arranged at the upper end of the cyclone type receptacle in its centre. Through central extraction and the tangential introduction, a vortex is induced inside the receptacle. Due to the centrifugal force solid particles and liquid droplets are forced to the wall of the cyclone type receptacle. On the cooled wall substances condense which are contained in the process gas. The condensate as well as the solid particles and liquid droplets run downwards on the wall of the cyclone type receptacle. In this way efficient purification of the process gas is achieved.

In a further advantageous embodiment of the invention the separation device comprises an electrostatic filter and/or a mechanical filter. Thus, solid particles can be effectively removed from the process gas.

Fittingly, the packing comprises a metal, glass or ceramic material. The packing is then long lasting.

According to a further aspect of the invention, in a method for the purification of a process gas of a reflow soldering system, the process gas is brought into contact with a liquid fluid and passed through at least one bed of packing.

Due to the use of the liquid fluid maintenance and service work can be carried out more simply and more quickly. While the process gas flows through the at least one bed of packing, droplets of the fluid and/or waste products of the soldering process in the reflow soldering system are removed from the process gas by means of which contaminants in the soldering system can be avoided.

Fittingly, the process gas is brought into contact with the fluid in that it is passed through a volume filled with the fluid. Here, bubbles of the process gas rise through the fluid. On the walls of the bubbles the waste products can pass from the process gas into the fluid and thus be removed from the process gas.

In a further advantageous embodiment of the invention, after flowing through the volume filled with the fluid, the process gas is passed through at least one column plate on which the at least one bed of packing is located. Droplets of the fluid, which have been taken up by the process gas when flowing through the volume filled with the fluid, can here be deposited on the packing by means of which they are removed from the process gas.

Fittingly, the process gas is passed through several column plates on each of which a bed of packing is located. In this way droplets of the fluid can be particularly thoroughly removed from the process gas.

According to a further embodiment of the invention, the process gas is brought into contact with the fluid in that the at least one bed of packing is moistened with the fluid. When the process gas flows past the moistened packing, the waste products pass into the fluid from the process gas and are thus removed from the process gas. The totality of the packing in the bed represents a large boundary area between the process gas and the fluid by means of which thorough purification of the process gas is achieved.

Fittingly, the at least one bed of packing is moistened with the fluid in that the fluid is sprayed and/or dripped onto the at least one bed of packing. In this way the fluid is uniformly distributed over the packing.

In a further advantageous embodiment of the invention additionally the fluid and/or the at least one bed of packing is cooled by means of which an advantageous temperature for the purification of the process gas can be established.

According to a further embodiment of the invention, after it has been passed through the at least one bed of packing, the process gas is passed into a separation device. In this way droplets and/or vapours of the fluid and residues of the waste products, which have not been absorbed by the liquid fluid, can be removed from the process gas.

Fittingly, the separation device comprises a cooled cyclone type receptacle. The process gas is passed into the cyclone type receptacle tangentially to a circumference of the cyclone type receptacle at an upper end. The process gas is passed out of the cyclone type receptacle at the upper end in the centre. Due to the centrifugal force, which acts on the process gas flowing round in the cyclone type receptacle, the droplets, vapours and waste products are separated from the process gas and condense on the cooled receptacle walls.

Advantageously, the separation device comprises an electrostatic filter and/or a mechanical filter by means of which solid particles can be particularly thoroughly removed from the process gas.

Fittingly, the packing comprises a metal, glass or ceramic material. In this way a long service life for the packing can be achieved.

Figure 2:
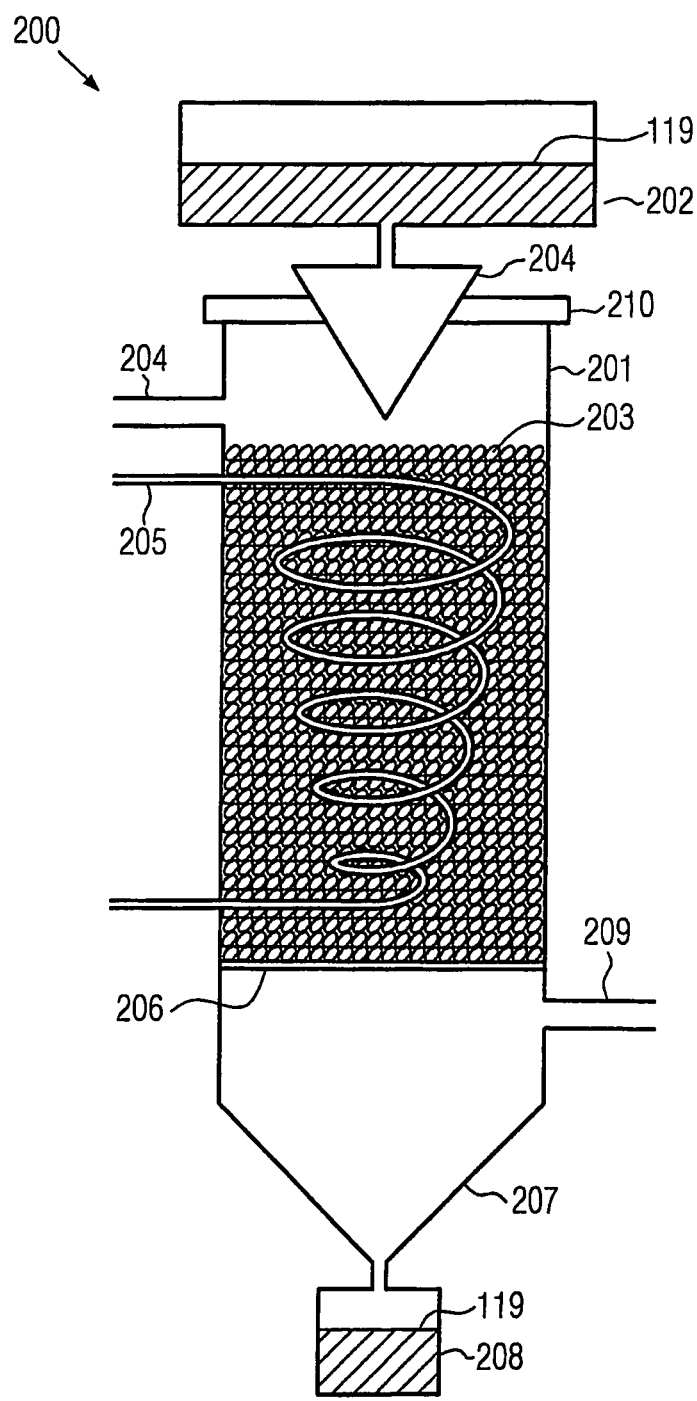
Figure 3:
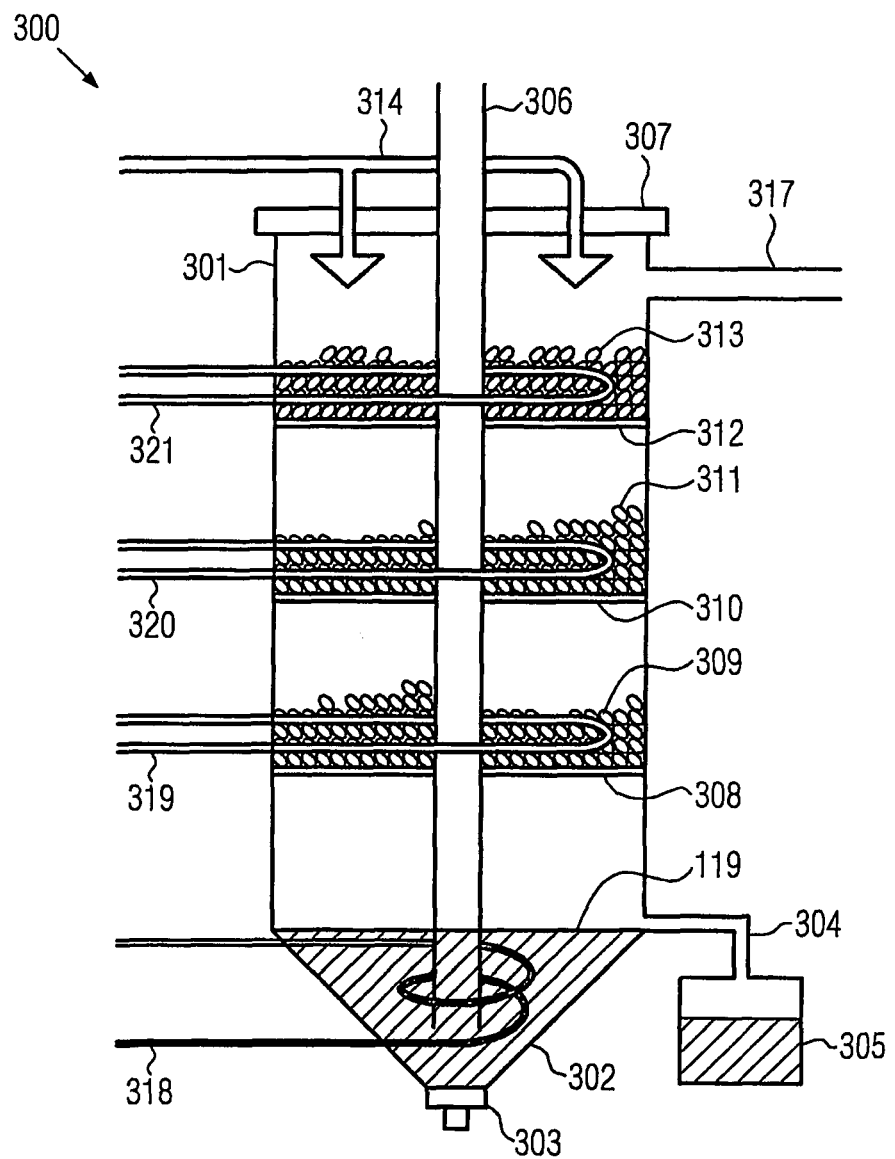

The invention will now be explained in more detail based on embodiments and the included drawings which refer to these embodiments. The following are shown:

FIG. 1 a schematic cross-sectional view of a device for the purification of a process gas of a reflow soldering system according to an embodiment of the present invention;

FIG. 2 a schematic cross-sectional view of an agglomerator in a device for the purification of a process gas of a reflow soldering system according to an embodiment of the present invention; and FIG. 3 a schematic cross-sectional view of a gas scrubber column in a device for the purification of a process gas of a reflow soldering system according to an embodiment of the present invention.

An embodiment of the present invention will now be explained based on FIG. 1.

FIG. 1 shows a schematic cross-sectional view of a device 100 for the purification of a process gas of a reflow soldering system according to an embodiment of the present invention.

The device 100 comprises a gas scrubber column 102. A gas feed 115 of the gas scrubber column 102 is connected to a reflow soldering system 101. The gas feed 115 is formed as a pipe, which essentially runs in a vertical direction into a receptacle 106 and approximately through the middle of it. A process gas of the soldering system 100 can flow into the receptacle 106 through the gas feed 115. During the operation of the device 100, the receptacle 106 is closed by a cover 116 which can be removed for maintenance work on the gas scrubber column 102. In this way access to the inside of the receptacle 106 is facilitated.

A volume 132 in the lower part of the receptacle 106 is designed to accommodate a liquid fluid 119 which is used for the purification of the process gas from the waste products. In this way, in the volume 132 a bath of the liquid fluid 119 can be provided. The fluid 119 can for example contain modified alcohol, alkoxylates and polyglycols (such as for example the flux gas scrubber VP1465 from Kolb Reinigungstechnik). The volume 132 can for example be formed in the shape of an essentially cone shaped cavity. An arrangement 125 for feeding the fluid 119 to the receptacle 106 is provided on the lower part of the volume 132. The arrangement 125 can for example comprise a connector which is suitable for the connection of a pipe for the fluid and a tap with which a link between the volume 132 and the connector can be opened and closed.

The gas feed 115 is designed to feed the process gas of the reflow soldering system 100 to the volume 132 and thus to pass it into the bath of fluid 119. For this purpose an opening 133 of the gas feed can be situated beneath a level of the liquid fluid 119 provided during the operation of the device 100.

In the upper part of the receptacle 106 the column plates 109, 111, 113 are arranged one above the other. A bed 110 of packing is located on the column plate 109. Correspondingly, beds 112, 114 of packing are also located on the column plates 111, 113.

The column plates 109, 111, 113 can for example each comprise a grid or a plate with holes. A size of the openings between the rods of the grid or of the holes in the plate is fittingly designed such that the packing cannot fall through the column plates 109, 111, 113. The process gas of the reflow soldering system 101 can however flow through the column plates 109, 111, 113 and the beds 110, 112, 114 of packing.

The packing can comprise a material which is designed not to be corroded by the process gas and the fluid 119. It could contain for example a metal such as stainless steel, glass or a ceramic material. It can have a long shape, for example an approximate cylindrical, cubic or ellipsoidal form; in a special embodiment of the present invention the packing pieces have a length of approximately 3 cm and a diameter of approximately 1 cm. In some embodiments the packing pieces can have pores and/or irregularities on their surfaces. A surface of the packing is enlarged advantageously in this way.

The receptacle 106 need not include three column plates and three beds of packing. In other embodiments the receptacle 106 comprises a single, two or four or more column plates on each of which a bed of packing is located.

Above the column plates 109, 111, 113 and the beds 110, 112, 114 of packing arranged on them there is a gas outlet 117, through which the process gas can leave the receptacle 106 after it has flowed from the gas feed 115 through the volume 132 and the beds 110, 112, 114.

Furthermore, the device 100 comprises a cooling device 134. The cooling device 134 contains a system 105 for the provision of a coolant. The system 105 is connected to a casing 131 of the receptacle 106 by pipes 128, 129. The casing 131 comprises an outer wall 107 and an inner wall 108 of the receptacle 106. The coolant can flow through the pipe 128 into a space between the outer wall 107 and the inner wall 108, leaving it by the pipe 129 and then flowing back to the system 134. While the coolant is located in the space between the walls 107, 108, an interchange of heat can take place between the coolant and the liquid fluid 119 and/or the process gas, thus reducing the temperature of the fluid 119 or of the process gas. Fittingly, the cooling device 134 is designed to maintain a temperature of the fluid and/or of the process gas in a range from approximately 80° C. to approximately 100° C. The coolant can for example contain water.

During the operation of the device 100 the process gas of the reflow soldering system 101 is passed through the gas feed 115 into the volume 132, which is filled with the fluid 119. An amount of the fluid 119 in the volume 132 can be adjusted via the arrangement 125 for feeding the fluid such that the opening 133 of the gas feed 115 is located below the level of the fluid 119. The process gas then flows in the form of bubbles through the fluid 119. On the walls of the bubbles waste products of the soldering process in the reflow soldering system 101 can pass out of the process gas into the fluid 119. In this way the waste products can at least be partially removed from the process gas.

When the process gas has flowed through the volume 132 with the fluid 119, it flows inside the receptacle upwards to the gas outlet 117. In doing this, it flows consecutively through the column plates 109, 111, 113 and the beds 110, 112, 114 of packing arranged on them.

When flowing through the packing beds 110, 112, 114 the process gas comes into contact with the surface of the packing. Droplets of the fluid 119, which are taken along by the process gas when flowing through the fluid 119, can here be deposited on the surface of the packing. Vapours of the fluid 119 can condense on the packing and be removed in this way from the process gas. Also residues of the waste products of the soldering process can be deposited on the packing. These processes, through which the process gas is further purified, can be particularly supported when the totality of the packing in the packing beds has a large surface. This can for example be achieved by providing a large quantity of packing pieces for each packing bed, by providing several column plates each with a bed of packing and/or by enlarging the surface of the individual packing pieces, such as through structures on the surface of the packing pieces and/or through pores.

The gas outlet 117 can be designed to feed the process gas to a separation device 103 after it leaves the receptacle 106. The separation device 103 comprises a cyclone type receptacle 121, which for example is formed with a hopper shape in the embodiment illustrated in FIG. 1. The inner space of the receptacle 121 has a wider radius at an upper end than at a lower end. The cyclone type receptacle 121 has an outer wall 120 and an inner wall 122. The outer wall 120 and the inner wall 122 together form a casing of the cyclone type receptacle 121. Coolant can be passed from the system 105 into the space between the walls 120, 122 through a coolant feed 126 and via a pipe 130. The coolant can leave the casing through a coolant outlet 127 and flow back to the system 105.

The casing of the cyclone type receptacle 121 need not be connected to the same system 105 for the provision of a coolant as the casing 131 of the receptacle 106. In other embodiments of the present invention separate coolant supplies can be provided for the gas scrubber column 102 and the separation device 103.

An opening on the upper end of the cyclone type receptacle 121 is closed by a cover 123 during the operation of the separation device 103. The cover 123 can be opened to carry out maintenance work on the separation device 103.

The separation device 103 has a gas inlet 118. This inlet is designed to introduce the process gas tangentially to a circumference of the cyclone type receptacle at an upper end of the cyclone type receptacle 121. For this purpose the gas inlet 118 can comprise a pipe which runs inside the cyclone type receptacle a little further parallel to its circumference.

A gas outlet 135 is fitted to the upper end of the cyclone type receptacle 121 in its centre. This runs essentially vertically through the cover 123. A catchment receptacle 124 is located at the lower end of the cyclone type receptacle 121.

During the operation of the device 100 the process gas flows through the gas inlet 103 into the cyclone type receptacle 121 and in fact tangentially to its circumference. In this way a rotational movement of the process gas inside the receptacle 121 arises. Solid particles and/or liquid droplets in the process gas are, due to the rotational movement, subjected to a centrifugal force and are forced against the wall 122 of the cyclone type receptacle 121. They move downwards along the wall 122 and finally fall into the catchment receptacle 124. Gaseous waste products of the soldering process and vapours of the fluid 119 condense on the cooled wall 122 and then similarly run downwards into the catchment receptacle 124.

So that the separated substances can run particularly easily into the catchment receptacle 124, the wall 122 can have an anti-adhesion coating on the inner side of the cyclone type receptacle 121. The anti-adhesion coating can for example contain perfluoralkoxy (PFA) or Teflon.

The process gas flows through the gas outlet 135 upwards out of the cyclone type receptacle 121. Then the process gas can be further purified by a filter device 104, before it is passed again to the reflow soldering system 101. The filter device 104 can for example comprise a mechanical filter and/or an electrostatic filter known to persons skilled in the art.

The device 100 for the purification of a process gas of a reflow soldering system need not have a filter device 104. In other embodiments of the present invention the process gas is returned straightaway to the reflow soldering system 101 after it has left the separation device 103. In further embodiments of the invention the device 100 comprises no separation device 103. In embodiments of this nature the process gas can be fed to the filter device 104 after leaving the gas scrubber column 102. Alternatively, the process gas can be returned directly from the gas outlet 117 on the gas scrubber column 102 to the reflow soldering system 101. In this case the filter device 104 can be omitted.

Apart from the structural elements described above, the device 100 can comprise pumps for the transport of the purification agent 119 and/or of the coolant. These items are not illustrated in FIG. 1 for the sake of clarity.

FIG. 2 illustrates a schematic cross-sectional view of an agglomerator 200. In some of the embodiments of the present invention the agglomerator 200 can replace the gas scrubber column 102 in the device 100 for the purification of a process gas of a reflow soldering system illustrated in FIG. 1.

The agglomerator 200 comprises a receptacle 201. The receptacle 201 can comprise a cover 210. This cover is closed during the operation of the device 100 and can be opened for service and maintenance work to facilitate easy access to the interior of the receptacle 201. A gas feed 204 is designed to feed the process gas from the reflow soldering system 101 to the receptacle 201. In the interior of the receptacle 201 a column plate 206 is fitted on which a bed 203 of packing is located.

In addition the receptacle 201 contains a cooler 205. The cooler is suitable for the through-flow of a coolant and can for example be provided in the form of a pipe of a material of high thermal conductivity, for example copper or aluminium, which runs through the bed 203 of packing. In other embodiments the cooler can comprise one or several hollow plates of thermally conductive material which are designed for the through-flow of coolant.

In further embodiments of the invention the receptacle 201 can have instead of the cooler 201 or additionally to it a casing similar to the casing 131 of the gas scrubber column 102 (FIG. 1) for the through-flow of a coolant.

The agglomerator 200 need not, as shown in FIG. 2, comprise a single bed of packing. In other embodiments of the present invention the agglomerator can contain two or more beds of packing. Thus, the agglomerator 200 contains at least one bed of packing. In some embodiments the at least one bed of packing can take up half or more than half of the volume of the receptacle 201.

A gas outlet 209 is fitted below the column plate 206. Process gas, which has flowed through the gas feed 204 into the receptacle 201 and through the bed 203 of packing, can leave the receptacle 201 through the gas outlet 209.

The agglomerator 200 also contains an arrangement 204 for feeding a liquid fluid 119. This is connected to a tank 202 for the fluid 119. The arrangement 204 can for example comprise a spray device and/or a drop dispenser. At the lower end of the receptacle 201 there is a catchment receptacle 208 into which the fluid 119 can flow when it has seeped through the bed 203 of packing and the column plate 206. To ease the downward flow of the fluid 119, the receptacle 201 can have a cyclone type region 207 at its lower end, at the tip of which the catchment receptacle 208 is fitted.

During the operation of the device 100 for the purification of a process gas of a reflow soldering system, the liquid fluid 119 is brought via the arrangement 204 onto the bed 203 of packing. In this way the packing is moistened with the fluid 119. The process gas is passed from the soldering system 101 through the gas feed 204 into the receptacle 201 and flows through the bed 203 of packing. Here, the process gas comes into contact with the fluid 119. Waste products from the soldering process in the soldering system 101 can thus be absorbed by the fluid 119. An operating temperature of the agglomerator 200 can be maintained by cooling in a range of approximately 80° C. to approximately 100° C.

Then the process gas flows through the gas outlet 209 out of the receptacle 201 and can be passed to the separation device 117, filter device 104 or the reflow soldering system 101.

FIG. 3 shows a schematic cross-sectional view of a gas scrubber column 300, which can replace the gas scrubber column 102 in the device 100 described above with reference to FIG. 1 for the purification of a process gas of a reflow soldering system.

The gas scrubber column 300 comprises a receptacle 301 which can be closed off by a cover 307. The receptacle 301 comprises column plates 308, 310, 312 on each of which a bed 309, 311, 313 of packing is located. In a lower part of the receptacle 301 there is a suitable volume 302 for accommodating the liquid fluid 119 and into which the fluid 119 can be brought via a first arrangement 303 for feeding the fluid, which for example can comprise a suitable connector for connection to a pipe and a tap.

A gas feed 306 similar to the gas feed 115 of the gas scrubber column 102 is designed to feed the process gas to the suitable volume 302 for accommodating the liquid fluid 119. The process gas flows through the fluid 119, column plates 308, 310, 312 and the beds 309, 311, 313 of packing and leaves the receptacle through a gas outlet 317. When flowing through the packing beds 309, 311, 313 waste products and/or droplets or vapours of the fluid 119 can be deposited on the packing and in this way be removed from the process gas. Then the process gas can be fed, as described above, to the separation device 103, filter device 104 or the reflow soldering system 101.

Liquid fluid 119 can be brought above the packing beds 309, 311, 313 into the receptacle 301 to moisten the packing beds 309, 311, 313 with the fluid 119 using a second arrangement 314 for feeding liquid fluid 119, which, similar to the arrangement 204 in the agglomerator 200, can comprise at least one spray device and/or at least one drop dispenser. In this way the purification of the process gas in the packing beds 309, 311, 313 can be improved and waste products of the soldering process in the reflow soldering system deposited on the packing can be washed off the packing by the fluid 119.

The volume 302 suitable for the accommodation of the fluid 119 can comprise an overflow 304, which is connected to a catchment receptacle 305. In this way the feed of the fluid 119 through the second arrangement 314 to the receptacle 301 can be compensated so that a level of the fluid 119 in the volume 302 essentially remains constant during the operation of the device 100.

Coolers 318, 319, 320, 321 are provided in the volume 302 suitable for the accommodation of the fluid 119 and in the packing beds 309, 311, 313. Similar to the cooler 205 in the agglomerator 200 described above with reference to FIG. 2, these said coolers can comprise pipes or hollow plates which are suitable for the through-flow of a coolant, such as for example water. Through cooling, a temperature of the fluid 119 in the volume 302 and the packing beds 309, 311, 313 can be maintained in the range from approximately 80° C. to approximately 100° C. In further embodiments the gas scrubber column can be additionally or alternatively cooled with the coolant by it flowing through a casing of the receptacle 301 similar to the casing 131 of the gas scrubber column 102 described above with reference to FIG. 1.

The invention claimed is:

1. A reflow soldering system containing a process gas and a purification system for purifying the gas comprising:
   a receptacle comprising at least a first and a second section, wherein each of the at least first and second sections comprise:
      a bed of packing,
      a cooler configured to cool a temperature of a liquid fluid in the receptacle and the bed of packing, and
      an electrostatic filter or a mechanical filter;
   an arrangement comprising at least one splay nozzle or at least one drop dispenser, wherein the arrangement is configured to:
      feed the liquid fluid from above and onto each of the beds of packing, and
      moisten each of the beds of packing with the liquid fluid, wherein the liquid fluid flows through each of the beds of packing in a first direction;
   a gas feed configured to feed the process gas from above and into the receptacle, wherein:
      the process gas flows through each of the moistened beds of packing in the first direction, and
      the process gas is brought into contact with the liquid fluid;
   a gas outlet configured to discharge the process gas from the receptacle after flowing through the beds of packing in the first direction; and
   a catchment receptacle configured to receive the liquid fluid at the lower end of the receptacle.

2. The reflow soldering system according to claim 1, further comprising a volume configured to accommodate fluid suitable for introducing the process gas.

3. The reflow soldering system according to claim 1, wherein each of the first and second sections comprise a column plate configured to hold each of the beds of packing.

4. The reflow soldering system according to claim 1, further comprising an additional cooling device.

5. The reflow soldering system according to claim 4, wherein the additional cooling device comprises a casing of the receptacle suitable for through-flow of a coolant.

6. The reflow soldering system according to claim 4, wherein the additional cooling device comprises a cooler in the interior of the receptacle suitable for through-flow of a coolant.

7. The reflow soldering system according to claim 1, further comprising a separation device.

8. The reflow soldering system according to claim 7, wherein the separation device comprises:
   a cyclone type receptacle comprising a casing configured to allow through-flow of a coolant;
   a gas inlet configured to introduce the process gas tangentially to a circumference of the cyclone type receptacle at an upper end of the cyclone type receptacle; and
   an essentially vertical gas outlet which is arranged at the upper end of the cyclone type receptacle in its center.

9. The reflow soldering system according to claim 7, wherein the separation device comprises an electrostatic filter or a mechanical filter.

10. The reflow soldering system according to claim 1, wherein each of the beds of packing comprise a metal, glass or a ceramic material.

11. A method for purification of a process gas of a reflow soldering system comprising:
   introducing a liquid fluid via an arrangement in a receptacle having at least a first and a second section, wherein:
      each of the first and second sections have a bed of packing,
      the liquid fluid is introduced by spraying or dripping from above and onto each of the beds of packing,
      the liquid fluid flows through and moistens each of the beds of packing in a first direction, and
      the liquid fluid and each of the beds of packing are cooled by a cooling device;
   feeding a process gas from above and into the receptacle and through the fluid, wherein the process gas flows through each of the beds of packing in the first direction and is brought into contact with the liquid fluid and wherein the process gas is moistened with the fluid;
   discharging the process gas from the receptacle after flowing through each of the beds of packing in the first direction: and
   collecting the liquid fluid in the catchment receptacle after it has seeped through each of the beds of packing.

12. The method according to claim 11, wherein each of the beds of packing is held by a column plate.

13. The method according to claim 11, wherein the process gas is passed to a separation device after it has been passed through each of the beds of packing.

14. The method according to claim 13, wherein the separation device comprises a cooled cyclone type receptacle, and the method further comprises:
   passing the process gas into a cooled cyclone type receptacle tangentially to a circumference of the cyclone type receptacle at an upper end of the cyclone type receptacle; and
   passing the process gas out of the cyclone type receptacle at the upper end in the center.

15. The method according to claim 13, further comprising including an electrostatic or mechanical filer in the separation device.

16. The method according to claim 11, further comprising using a metal, glass or a ceramic material in each of the beds of packing.

17. The method of claim 11, wherein the liquid fluid and process gas both descend through the beds of packing in the first direction.

\* \* \* \* \*

UNITED STATES PATENT AND TRADEMARK OFFICE
CERTIFICATE OF CORRECTION

PATENT NO. : 8,518,157 B2
APPLICATION NO. : 11/885763
DATED : August 27, 2013
INVENTOR(S) : Hans Bell It is certified that error appears in the above-identified patent and that said Letters Patent is hereby corrected as shown below:

In the Claims:

In Column 9, line 43, please replace "splay" with --spray--.

Signed and Sealed this
Twelfth Day of November, 2013

Teresa Stanek Rea
*Deputy Director of the United States Patent and Trademark Office*